US008612272B1

(12) United States Patent
Aykin

(10) Patent No.: US 8,612,272 B1
(45) Date of Patent: Dec. 17, 2013

(54) SYSTEM AND METHOD FOR SKILLS-BASED STAFFING AND SCHEDULING

(75) Inventor: Turgut Aykin, Atlantic Highlands, NJ (US)

(73) Assignee: Turgut Aykin, Atlantic Highlands, NJ (US)

(\*) Notice: Subject to any disclaimer, the term of this patent is extended or adjusted under 35 U.S.C. 154(b) by 604 days.

(21) Appl. No.: 12/584,210

(22) Filed: Sep. 2, 2009

Related U.S. Application Data

(63) Continuation-in-part of application No. 11/446,711, filed on Jun. 5, 2006, now Pat. No. 7,987,106.

(51) Int. Cl.
*G06Q 10/00* (2006.01)
*G06Q 10/06* (2012.01)

(52) U.S. Cl.
CPC .................... *G06Q 10/063* (2013.01)
USPC ........ 705/7.11; 705/7.12; 705/7.13; 705/7.22

(58) Field of Classification Search
None
See application file for complete search history.

(56) References Cited

U.S. PATENT DOCUMENTS

| | | | | |
|---|---|---|---|---|
| 5,216,593 | A * | 6/1993 | Dietrich et al. | 345/467 |
| 6,002,863 | A * | 12/1999 | Sheer et al. | 703/22 |
| 6,044,355 | A * | 3/2000 | Crockett et al. | 705/7.39 |
| 6,192,122 | B1 * | 2/2001 | Flockhart et al. | 379/266.01 |
| 6,563,920 | B1 * | 5/2003 | Flockhart et al. | 379/265.1 |
| 6,581,027 | B1 * | 6/2003 | Sheer et al. | 703/9 |
| 6,622,134 | B1 * | 9/2003 | Sorkin | 706/20 |
| 6,744,877 | B1 * | 6/2004 | Edwards | 379/265.02 |
| 6,766,012 | B1 * | 7/2004 | Crossley | 379/265.02 |
| 6,831,966 | B1 * | 12/2004 | Tegan et al. | 379/88.16 |
| 6,856,680 | B2 * | 2/2005 | Mengshoel et al. | 379/265.06 |
| 6,970,829 | B1 * | 11/2005 | Leamon | 705/7.14 |
| 7,249,047 | B2 * | 7/2007 | Arguello et al. | 705/7.14 |
| 7,451,098 | B2 * | 11/2008 | Ingman et al. | 705/7.14 |
| 7,478,051 | B2 * | 1/2009 | Nourbakhsh et al. | 705/7.37 |
| 7,725,339 | B1 * | 5/2010 | Aykin | 705/7.14 |
| 2004/0054564 | A1 * | 3/2004 | Fonseca et al. | 705/7 |
| 2004/0111311 | A1 * | 6/2004 | Ingman et al. | 705/9 |
| 2006/0112049 | A1 * | 5/2006 | Mehrotra et al. | 706/46 |
| 2007/0121897 | A1 * | 5/2007 | Patakula et al. | 379/265.05 |
| 2007/0129996 | A1 * | 6/2007 | Babine et al. | 705/11 |
| 2010/0017241 | A1 * | 1/2010 | Lienhardt | 705/8 |

OTHER PUBLICATIONS

Cezik MT and L'Ecuyer P (2008). Staffing Multiskill Call Centers via Linear Programming and Simulation. Management Science Feb. 2008 54(2): 310-323.*

(Continued)

*Primary Examiner* — Brett Feeney
(74) *Attorney, Agent, or Firm* — Turgut Aykin

(57) ABSTRACT

An invention for scheduling employees in a skills-based contact routing environment in which each employee has one or more skills and belongs to a skill group. The invention includes an initialization step and an iterative step. In the initialization step, the invention generates initial staffing levels and initial agent schedules for each skill group. In the iterative step, a skill group is selected and unscheduled while keeping agents in other skill groups on their current schedules, agent requirements for the skill group selected are updated using a staffing model that applies contact routing rules and includes the number of agents scheduled for work in other skill groups, and agents are rescheduled in the selected skill group. In each iteration each skill group is unscheduled, agent requirements are updated, and agents are rescheduled once. Iterations continue until one or more stopping criteria are satisfied.

14 Claims, 4 Drawing Sheets

(56) References Cited

OTHER PUBLICATIONS

Bhulai S, Koole G, and Pot A (2008). Simple Methods for Shift Scheduling in Multiskill Call Centers. Manufacturing & Service Operations Management. Summer 10(3): 411-420.*
Cyril Canon (2006). Personnel scheduling in the Call Center industry. PHD Thesis PHD Thesis. Received: Mar. 7, 2006. 4OR (2007) 5:89-92.*
Dano (2004). Department of Mathematics Vrije Universiteit Amsterdam. Workforce scheduling with logical constraints: theory and applications in call centers. Jul. pp. 1-58.*
Emil E, Ormeci EL and Salman FS (2007). Shift Scheduling in Call Centers with Multiple Skill Sets and Transportation Costs. IEEE. 1-6.*
Li H and Womer K (2009). Scheduling projects with multi-skilled personnel by a hybrid MILP/CP benders decomposition algorithm. J Sched Published online: Sep. 3, 2008.12: 281-298.*
Atlason, J., M. Epelman and S. G. Henderson, "Optimizing Call Center Staffing Using Simulation and Analytic Cutting-Plane Methods," Management Science, vol. 54, 295-309, 2008.
Atlason, J., M. Epelman and S. G. Henderson, "Call Center Staffing with Simulation and Cutting Plane Methods," Annals of Operations Research, vol. 127, 333-358, 2004.
Atlason, J., M. Epelman and S. G. Henderson, "Optimizing Call Center Staffing Using Simulation and Analytic Cutting-Plane Methods," Management Science, vol. 54, 295-309, 200.
Bazaraa, M. S. and C.M. Shetty, Nonlinear Programming: Theory and Algorithms, John Wiley & Sons, 1979.
Bhuli, S., G. Koole and A. Pot, "Simple Methods for Shift Scheduling in Multiskill Call Centers," Manufacturing and Service Operations Management, vol. 10, 411-420, 2008.
Cezik, M.T. and P. L'Ecuyer, "Staffing Multiskill Call Centers via Linear Programming and Simulation," Management Science, vol. 54, 310-323, 2008.
Cyril, C., "Personnel Scheduling in the Call Center Industry," Ph.D. Thesis, Received: Mar. 7, 2006, 4OR, 5:89-92, 2007.
Dano, G. "Workforce Scheduling with Logical Constraints: Theory and Applications in Call Centers," M.S. Thesis, Department of Mathematics, Vrije Universitiet Amsterdam, 2004.
Emil, E., E.L. Ormeci and F.S. Salman, "Shift Scheduling in Call Centers with Multiple Skill Sets and Transportation Costs," Proceedings of the IEEE International Conference *on Service Operations and Logistics, and Informatics* (SOLI), Philadelphia, USA, 80-87, 2007.
Li,H. and K. Womer, "Scheduling Projects with Multi-skilled Personnel by a Hybrid MILP/CP Benders Decomposition Algorithm," J. of Scheduling, vol. 12, 281-298, 2008.
Law, A. M. and W. D. Kelton, Simulation Modeling and Analysis, 3rd ed., McGraw-Hill, Boston, MA, 2000.
Taha, H. A., Operations Research: An Introduction, 4th ed., McMillian, New York, NY, 1987.
Wolsey, L. A., Integer Programming, john Wiley & Sons, New York, NY, 1998.

\* cited by examiner

FIG. 2.

| Number of Days-off | Number of Consecutive Days-off | Day | | | | | | |
|---|---|---|---|---|---|---|---|---|
| | | 1 | 2 | 3 | 4 | 5 | 6 | 7 |
| 0 | 0 | 1 | 1 | 1 | 1 | 1 | 1 | 1 |
| 1 | 1 | 0 | 1 | 1 | 1 | 1 | 1 | 1 |
| | 1 | 1 | 0 | 1 | 1 | 1 | 1 | 1 |
| | 1 | 1 | 1 | 0 | 1 | 1 | 1 | 1 |
| | 1 | 1 | 1 | 1 | 0 | 1 | 1 | 1 |
| | 1 | 1 | 1 | 1 | 1 | 0 | 1 | 1 |
| | 1 | 1 | 1 | 1 | 1 | 1 | 0 | 1 |
| | 1 | 1 | 1 | 1 | 1 | 1 | 1 | 0 |
| 2 | 2 | 0 | 0 | 1 | 1 | 1 | 1 | 1 |
| | 2 | 1 | 0 | 0 | 1 | 1 | 1 | 1 |
| | 2 | 1 | 1 | 0 | 0 | 1 | 1 | 1 |
| | 2 | 1 | 1 | 1 | 0 | 0 | 1 | 1 |
| | 2 | 1 | 1 | 1 | 1 | 0 | 0 | 1 |
| | 2 | 1 | 1 | 1 | 1 | 1 | 0 | 0 |
| | 2 | 0 | 1 | 1 | 1 | 1 | 1 | 0 |
| | 1 | 0 | 1 | 0 | 1 | 1 | 1 | 1 |
| | 1 | 0 | 1 | 1 | 0 | 1 | 1 | 1 |
| | 1 | 0 | 1 | 1 | 1 | 0 | 1 | 1 |
| | 1 | 0 | 1 | 1 | 1 | 1 | 0 | 1 |
| | 1 | 1 | 0 | 1 | 0 | 1 | 1 | 1 |
| | 1 | 1 | 0 | 1 | 1 | 0 | 1 | 1 |
| | 1 | 1 | 0 | 1 | 1 | 1 | 0 | 1 |
| | 1 | 1 | 0 | 1 | 1 | 1 | 1 | 0 |
| | 1 | 1 | 1 | 0 | 1 | 0 | 1 | 1 |
| | 1 | 1 | 1 | 0 | 1 | 1 | 0 | 1 |
| | 1 | 1 | 1 | 0 | 1 | 1 | 1 | 0 |
| | 1 | 1 | 1 | 1 | 0 | 1 | 0 | 1 |
| | 1 | 1 | 1 | 1 | 0 | 1 | 1 | 0 |
| | 1 | 1 | 1 | 1 | 1 | 0 | 1 | 0 |
| 3 | 3 | 0 | 0 | 0 | 1 | 1 | 1 | 1 |
| | 3 | 1 | 0 | 0 | 0 | 1 | 1 | 1 |
| | 3 | 1 | 1 | 0 | 0 | 0 | 1 | 1 |
| | 3 | 1 | 1 | 1 | 0 | 0 | 0 | 1 |
| | 3 | 1 | 1 | 1 | 1 | 0 | 0 | 0 |
| | 3 | 0 | 1 | 1 | 1 | 1 | 0 | 0 |
| | 3 | 0 | 0 | 1 | 1 | 1 | 1 | 0 |
| | 2 | 0 | 0 | 1 | 0 | 1 | 1 | 1 |
| | 2 | 0 | 0 | 1 | 1 | 0 | 1 | 1 |
| | 2 | 0 | 0 | 1 | 1 | 1 | 0 | 1 |
| | 2 | 1 | 0 | 0 | 1 | 0 | 1 | 1 |
| | 2 | 1 | 0 | 0 | 1 | 1 | 0 | 1 |
| | 2 | 1 | 0 | 0 | 1 | 1 | 1 | 0 |

|   |   |   |   |   |   |   |   |   |
|---|---|---|---|---|---|---|---|---|
|   | 2 | 1 | 1 | 0 | 0 | 1 | 0 | 1 |
|   | 2 | 1 | 1 | 0 | 0 | 1 | 1 | 0 |
|   | 2 | 0 | 1 | 0 | 0 | 1 | 1 | 1 |
|   | 2 | 1 | 1 | 1 | 0 | 0 | 1 | 0 |
|   | 2 | 0 | 1 | 1 | 0 | 0 | 1 | 1 |
|   | 2 | 1 | 0 | 1 | 0 | 0 | 1 | 1 |
|   | 2 | 0 | 1 | 1 | 1 | 0 | 0 | 1 |
|   | 2 | 1 | 0 | 1 | 1 | 0 | 0 | 1 |
|   | ·2 | 1 | 1 | 0 | 1 | 0 | 0 | 1 |
|   | 2 | 1 | 0 | 1 | 1 | 1 | 0 | 0 |
|   | 2 | 1 | 1 | 0 | 1 | 1 | 0 | 0 |
|   | 2 | 1 | 1 | 1 | 0 | 1 | 0 | 0 |
|   | 2 | 0 | 1 | 0 | 1 | 1 | 1 | 0 |
|   | 2 | 0 | 1 | 1 | 0 | 1 | 1 | 0 |
|   | 2 | 0 | 1 | 1 | 1 | 0 | 1 | 0 |
|   | 1 | 0 | 1 | 0 | 1 | 0 | 1 | 1 |
|   | 1 | 0 | 1 | 0 | 1 | 1 | 0 | 1 |
|   | 1 | 0 | 1 | 1 | 0 | 1 | 0 | 1 |
|   | 1 | 1 | 0 | 1 | 0 | 1 | 0 | 1 |
|   | 1 | 1 | 0 | 1 | 0 | 1 | 1 | 0 |
|   | 1 | 1 | 0 | 1 | 1 | 0 | 1 | 0 |
|   | 1 | 1 | 1 | 0 | 1 | 0 | 1 | 0 |
| 4 | 4 | 0 | 0 | 0 | 0 | 1 | 1 | 1 |
|   | 4 | 1 | 0 | 0 | 0 | 0 | 1 | 1 |
|   | 4 | 1 | 1 | 0 | 0 | 0 | 0 | 1 |
|   | 4 | 1 | 1 | 1 | 0 | 0 | 0 | 0 |
|   | 4 | 0 | 1 | 1 | 1 | 0 | 0 | 0 |
|   | 4 | 0 | 0 | 1 | 1 | 1 | 0 | 0 |
|   | 4 | 0 | 0 | 0 | 1 | 1 | 1 | 0 |
|   | 3 | 0 | 0 | 0 | 1 | 0 | 1 | 1 |
|   | 3 | 0 | 0 | 0 | 1 | 1 | 0 | 1 |
|   | 3 | 1 | 0 | 0 | 0 | 1 | 0 | 1 |
|   | 3 | 1 | 0 | 0 | 0 | 1 | 1 | 0 |
|   | 3 | 1 | 1 | 0 | 0 | 0 | 1 | 0 |
|   | 3 | 0 | 1 | 0 | 0 | 0 | 1 | 1 |
|   | 3 | 0 | 1 | 1 | 0 | 0 | 0 | 1 |
|   | 3 | 1 | 0 | 1 | 0 | 0 | 0 | 1 |
|   | 3 | 1 | 0 | 1 | 1 | 0 | 0 | 0 |
|   | 3 | 1 | 1 | 0 | 1 | 0 | 0 | 0 |
|   | 3 | 0 | 1 | 0 | 1 | 1 | 0 | 0 |
|   | 3 | 0 | 1 | 1 | 0 | 1 | 0 | 0 |
|   | 3 | 0 | 0 | 1 | 0 | 1 | 1 | 0 |
|   | 3 | 0 | 0 | 1 | 1 | 0 | 1 | 0 |
|   | 2 | 0 | 0 | 1 | 0 | 0 | 1 | 1 |
|   | 2 | 0 | 0 | 1 | 1 | 0 | 0 | 1 |
|   | 2 | 1 | 0 | 0 | 1 | 0 | 0 | 1 |
|   | 2 | 1 | 0 | 0 | 1 | 1 | 0 | 0 |
|   | 2 | 1 | 1 | 0 | 0 | 1 | 0 | 0 |

FIG.2. (Cont'd)

|   |   |   |   |   |   |   |   |   |
|---|---|---|---|---|---|---|---|---|
|   | 2 | 0 | 1 | 0 | 0 | 1 | 1 | 0 |
|   | 2 | 0 | 1 | 1 | 0 | 0 | 1 | 0 |
|   | 2 | 0 | 0 | 1 | 0 | 1 | 0 | 1 |
|   | 2 | 1 | 0 | 0 | 1 | 0 | 1 | 0 |
|   | 2 | 0 | 1 | 0 | 0 | 1 | 0 | 1 |
|   | 2 | 1 | 0 | 1 | 0 | 0 | 1 | 0 |
|   | 2 | 0 | 1 | 0 | 1 | 0 | 0 | 1 |
|   | 2 | 1 | 0 | 1 | 0 | 1 | 0 | 0 |
|   | 2 | 0 | 1 | 0 | 1 | 0 | 1 | 0 |
| 5 | 5 | 0 | 0 | 0 | 0 | 0 | 1 | 1 |
|   | 5 | 1 | 0 | 0 | 0 | 0 | 0 | 1 |
|   | 5 | 1 | 1 | 0 | 0 | 0 | 0 | 0 |
|   | 5 | 0 | 1 | 1 | 0 | 0 | 0 | 0 |
|   | 5 | 0 | 0 | 1 | 1 | 0 | 0 | 0 |
|   | 5 | 0 | 0 | 0 | 1 | 1 | 0 | 0 |
|   | 5 | 0 | 0 | 0 | 0 | 1 | 1 | 0 |
|   | 4 | 0 | 0 | 0 | 0 | 1 | 0 | 1 |
|   | 4 | 1 | 0 | 0 | 0 | 0 | 1 | 0 |
|   | 4 | 0 | 1 | 0 | 0 | 0 | 0 | 1 |
|   | 4 | 1 | 0 | 1 | 0 | 0 | 0 | 0 |
|   | 4 | 0 | 1 | 0 | 1 | 0 | 0 | 0 |
|   | 4 | 0 | 0 | 1 | 0 | 1 | 0 | 0 |
|   | 4 | 0 | 0 | 0 | 1 | 0 | 1 | 0 |
|   | 3 | 0 | 0 | 0 | 1 | 0 | 0 | 1 |
|   | 3 | 1 | 0 | 0 | 0 | 1 | 0 | 0 |
|   | 3 | 0 | 1 | 0 | 0 | 0 | 1 | 0 |
|   | 3 | 0 | 0 | 1 | 0 | 0 | 0 | 1 |
|   | 3 | 1 | 0 | 0 | 1 | 0 | 0 | 0 |
|   | 3 | 0 | 1 | 0 | 0 | 1 | 0 | 0 |
|   | 3 | 0 | 0 | 1 | 0 | 0 | 1 | 0 |
| 6 | 6 | 0 | 0 | 0 | 0 | 0 | 0 | 1 |
|   | 6 | 1 | 0 | 0 | 0 | 0 | 0 | 0 |
|   | 6 | 0 | 1 | 0 | 0 | 0 | 0 | 0 |
|   | 6 | 0 | 0 | 1 | 0 | 0 | 0 | 0 |
|   | 6 | 0 | 0 | 0 | 1 | 0 | 0 | 0 |
|   | 6 | 0 | 0 | 0 | 0 | 1 | 0 | 0 |
|   | 6 | 0 | 0 | 0 | 0 | 0 | 1 | 0 |
| 7 |   | 0 | 0 | 0 | 0 | 0 | 0 | 0 |

FIG.2. (Cont'd)

SYSTEM AND METHOD FOR SKILLS-BASED STAFFING AND SCHEDULING

RELATED APPLICATION

This application is a continuation in part of and claims the benefit of priority of U.S. patent application Ser. No. 11/446,711 filed on Jun. 5, 2006 now U.S. Pat. No. 7,987,106 which are fully incorporated by reference herein.

REFERENCES CITED

| application Ser. No. | Filing Date | | Inventor |
|---|---|---|---|
| 2004/0,054,564 A1 | March 2004 | * | Fonseca et al. |
| 2006/0,112,049 A1 | May 2006 | * | Mehrotra et al. |
| 2007/0,121,897 A1 | May 2007 | * | Patakula et al. |
| 2007/0,129,996 A1 | June 2007 | * | Babine et al. |
| 12/584,210 | August 2009 | | Aykin |

RELATED U.S. PATENT DOCUMENTS

| 5,216,593 A | June 1993 | * | Dietrich et al. | 345/467 |
|---|---|---|---|---|
| 5,911,134 | June 1999 | | Castonguay et al., | 64/401 |
| 6,002,863 A | December 1999 | * | Sheer at al. | 703/22 |
| 6,044,355 | March 2000 | | Crockett et al. | 705/7.39 |
| 6,192,122 B1 | February 2001 | * | Flockhart et al. | 379/266.01 |
| 6,278,978 | August 2001 | | Andre et al. | 705/7 |
| 6,563,920 B1 | March 2003 | * | Flockhart et al. | 379/265.1 |
| 6,581,027 B1 | June 2003 | * | Sheer et al. | 703/9 |
| 6,622,134 B1 | September 2003 | * | Sorkin | 706/20 |
| 6,744,877 B1 | June 2004 | * | Edwards | 379/265.02 |
| 6,823,315 | November 2004 | | Bucci et al. | 705/9 |
| 6,856,680 B2 | February 2005 | * | Mengshoel et al. | 379/265.06 |
| 6,970,829 | November 2005 | | Leamon | 705/9 |
| 6,970,829 B1 | November 2005 | * | Leamon | 705/7.14 |
| 7,249,047 B2 | July 2007 | * | Arguello et al. | 705/7.14 |
| 7,478,051 B2 | January 2009 | * | Nourbakhsh et al. | 705/7.37 |
| 7,725,339 | May 2010 | | Aykin | 705/7; 705/10 |

* cited by examiner

OTHER REFERENCES

Atlason, J., M Epelman and S. G. Henderson, "Call Center Staffing with Simulation and Cutting Plane Methods," *Annals of Operations Research*, vol. 127, 333-358, 2004.

Atlason, J., M. Epelman and S. G. Henderson, "Optimizing Call Center Staffing Using Simulation and Analytic Cutting-Plane Methods," *Management Science*, vol. 54, 295-309,2008.

Bazaraa, M. S. and C. M. Shetty, *Nonlinear Programming: Theory and Algorithms*, John Wiley & Sons, 1979.

Bhulai S., G. Koole and A. Pot, "Simple Methods for Shift Scheduling in Multiskill Call Centers," *Manufacturing and Service Operations Managements*, vol. 10, 411-420, 2008.

Cezik. M. T. and P. L'Ecuyer, "Staffing Multiskill Call Centers via Linear Programming and Simulation," *Management Science*, vol. 54, 310-323, 2008.

Cyril, C. "Personnel Scheduling in the Call Center Industry," Ph.D. Thesis, Received: 7 Mar. 2006. 4OR, 5:89-92, 2007.

Dano. G. "Workforce Scheduling with Logical Constraints: Theory and Applications in Call Centers," M.S. Thesis, Department of Mathematics, Vrije Universitiet Amsterdam, 1-58, 2004.

Emil, E., E. L. Ormeci and F. S. Salman, "Shift Scheduling in Call Centers with Multiple Skill Sets and Transport Costs," *IEEE*, 1-6, 2007.

Li, H. and K Womer, "Schedule Projects with Multi-skilled Personnel by a Hybrid MILP/CP Benders Decomposition Algorithm," *J. of Scheduling*, vol. 12, 281-298, 2008.

Law, A. M. and W. D. Kelton, *Simulation Modeling and Analysis*, $3^{rd}$ ed., McGraw-Hill, New York, 2000.

Taha, H. A., *Operations Research: An Introduction*, $4^{th}$ ed., McMillian, New York, N.Y., 1987.

Wolsey, L. A., *Integer Programming*, John Wiley & Sons, New York, N.Y., 1998.

FIELD OF INVENTION

The invention pertains to the field of computer systems and computer implemented methods. More specifically, the invention pertains to methods and computer systems for determining the needed staffing levels and scheduling staff members, each with one or more defined skills, to meet the service performance targets in skills-based and non-skills based routing environments serving a plurality of contact groups with time varying contact volumes and service times.

BACKGROUND OF THE INVENTION

The present invention provides a method and computer system for determining staffing levels and scheduling staff members to meet various performance targets in skills-based and non-skills based service systems. Examples of systems where the method and computer system of the invention are useful include contact centers where contact center agents may be trained in one or more skills to provide service to one or more types of customer calls (e.g. general information calls, sales calls, technical help calls, Spanish speaking callers, English speaking callers), hospitals where nurses and doctors may provide different types of medical services, banks where tellers may be specialized in one or more types of services, etc. Descriptions of the computer implemented method of the invention are provided for a contact center ("call center" and "contact center" are used interchangeably in this document) environment where customers place service requests by calling different phone numbers or by using mediums such as email, fax, or web chat, and a plurality of agents trained in the services sought by customers answer these contacts to provide services.

In a skills-based call center environment, a plurality of service requests are received at a plurality of call center locations where agents are located. A call center is typically a building with agent workstations that are connected to the public telephone system via an automatic call distributor (ACD). Two or more call centers may be connected to form virtual centers where agents may not be physically located in the same building but associated through organizational, skills possessed, or geographical units, etc. via an ACD. For instance, a service environment involving home based call center agents may be structured into organizational units (e.g. Dallas sales organizational unit) although agents may not be physically housed at the same location. Different call centers may have different operating hours and may be located in different time zones.

When a contact is received, an ACD either delivers it to an agent with the needed skill or queues it until such an agent becomes available. Contacts requiring the same service type that are serviced by an organizational unit over time are referred to as a "contact stream". There may be a plurality of contact streams associated with different organizational units. Contact streams that are used to obtain a particular type of service form a "contact group". For example, sales contact streams served by call centers located in Matawan, N.J., Atlanta, GA., Phoenix, Ariz. together form the "sales contact group". Likewise, there may be multiple channels of non-phone communication mediums (e.g. multiple email addresses) for requesting the same type of service. In the same manner, one or more contact streams using a different communication medium (e.g. email addresses for requesting the same type of service) form a contact group.

Agents may be skilled in providing service at various levels (called "skill level") rated from the most skilled to the least (e.g. expert level=1, average level=2, basic level=3, etc.). A skill level indicates the preference or proficiency level of an agent in providing service to contacts queued for that skill. The minimum skill level that may be permitted to serve a customer may also be specified. Agents with the same skill types and skill levels form a "skill group". Agents in a skill group may be located at a plurality of locations.

An agent schedule specifies work and non-work ("off") days, and daily shift start and end times. Moreover, depending on the length of a shift, an agent may be given one or more breaks. For example, an 8.5-hour shift may require two 15-minute relief breaks and one 30-minute lunch break. An agent's schedule also provides the start and end times for the daily breaks.

Agent schedules are generated over a period of time (called "scheduling period".) A scheduling period may be several days, a week or several weeks. Agent schedules generated over a scheduling period specify their daily shift start and end times, work and non-work ("days off") days, and daily break times. Although the method of the invention is described for a scheduling period of one week (7days), it can also be applied to generate schedules over any duration.

For staffing and agent scheduling, it is customary to divide a scheduling period in to periods of equal length (called "planning period".) A planning period may be 15, 30 or 60 minutes, or longer. Forecasts of the number of contacts (called "contact volumes") and average time required to serve a customer contact (interchangeably called "average handling time", "AHT" or for each contact group are generated by a forecasting system for each planning period over the scheduling period. One such forecasting system is described in the U.S. patent application Ser. No. 11/446,711 by Aykin.

There maybe one or more skill groups. If agents in each skill group have a single skill serving contacts and each contact group is served by one skill group exclusively, staffing and agent scheduling is in a "non-skills based" routing environment. If agents have one or more skills and contacts from multiple contact groups are routed to these agents following certain routing rules (e.g. highest skill level available for a contact), then staffing and scheduling is in a "skills-based" environment. In this type of systems, contact groups are not exclusively associated with an agent group but are served by one or more skill groups. Let the set of all skill groups be SG with the skills of the agents in skill group i be $S_i$. Let $s_i$ represent the number of skills in $S_i$.

For each contact group k, performance of the system over a planning period is measured by a service level ("service level") metric. Service level, $v_{kht}$ %, is calculated as the percentage of contacts from contact group k that are answered within the service level threshold, $\Delta_{kht}$ time units from their receipt, in planning period t on day h. Other performance metrics used at contact centers include the average speed of answer measuring the average waiting time for contacts that are eventually answered by an agent, abandonment percentage measuring the percentage of customers who decided to abandon their contacts before reaching an agent, and percentage of agent time occupied with work (called "agent occupancy"). Since service level is one of the widely used performance measures in contact centers, the method of the invention is illustrated for this measure. However, the computer implemented method and system of the invention can also be used with other performance measures.

Service level targets are usually set for contact groups. For example, a call center may express its service level target for a contact group as 80% of the contacts answered in 20 seconds or less of receipt in all planning periods. With such a target, the call center aims to schedule enough agents with required skills in each planning period to answer 80% of customer contacts in 20 seconds or less. Different service level targets may be specified for different planning periods and contact groups.

Some contact centers may place a limit on maximum agent occupancy while targeting a service level or other performance levels. For some contact groups generating revenues (e.g. catalog sales), the performance metric may be based on the maximization of profit. These operational variations found in contact centers are also within the scope of the method and system of the invention.

The number of agents in a skill group and their availabilities (i.e. number of weekly work hours, work day availability, etc.) are limited by the existing workforce. Over a longer period of time, call centers can increase (or decrease) the number of agents by hiring (or laying off).

Typically, there are constraints on the way an agent's schedule can be constructed (called "scheduling rules") comprising of daily shift start times, shift lengths, number of daily breaks, break lengths, earliest and latest start times ("break window") for each daily break, number of days off, number of consecutive work or off days, and number of weekend days off. Scheduling rules collectively specifying the way an agent's weekly work and non-work schedule can be constructed is called a "tour type" or simply a "tour". For example, a 5×8 tour type may specify 5 days of work with an 8-hour shift length, two daily relief breaks of 15-minute each, and one 30-minute daily lunch break. Moreover, it may require consecutive or non-consecutive days off, and identical or variable shift start and break times. To be scheduled, each agent must be assigned to a tour type. A tour type may have one or more agents assigned to it.

The number of agents in a skill group which are required to meet or exceed the service level targets is calculated for each planning period. These agent counts are interchangeably referred to as "staffing levels" or "agent requirements". As described below, in each iteration of the method of the invention, staffing levels for one skill group are updated. Once the required staffing levels are updated for a skill group, i agents in that skill group are scheduled. A schedule created for an agent specifies work and off days, daily shift start and end times, and daily break start and end times.

The method and system of the invention uses simulation and Integer Linear Programming (ILP) to determine staffing levels and agent schedules jointly in an iterative manner. Staffing levels are determined via simulation. An ILP based method described in a related patent application Ser. No. 10/614,483, filed Jul. 7, 2003 by the inventor is used for schedule optimization to meet the staffing levels determined by simulation.

The method of the invention begins with an initialization step in which agents in each skill group are scheduled assuming a non-skills-based environment such that each skill group serves the contact group for which it has the highest skill level, or a unique skill that is not shared by any other skill group. After the initialization step, starting with the selection of the skill group with the most skills, the following iterative process is applied: 1) unschedule agents in the selected skill group, 2) simulate the contact center environment with agents in other skill groups working their current schedules, contact volume and average service time forecasts for all contact groups, contact arrival, service and abandonments, and routing rules to determine the agent requirements for the skill group that was unscheduled to meet the service level targets for contact groups whose service levels are affected by the absence of such agents, and 3) schedule agents in the selected skill group to meet the agent requirements found in step (2). Steps (1-3) are repeated, by selecting one skill group at a time for unscheduling, from the skill group with the most skills to the skill group with the least skills, until all skill groups are rescheduled. When all skill groups are rescheduled by repeating steps (1-3) after the initialization step, this is called an "iteration". The method of the invention performs multiple iterations. Successive iterations are terminated when one or more stopping criteria are satisfied.

U.S. Pat. No. 5,911,134 issued on Jun. 8, 1999 to Castonguay et al. ("Castonguay method") describes a method for determining the staffing levels using the Erlang C model and developing weekly tour schedules in non-skills based call centers. The Castonguay method describes tour and shift construction rules to select tour and daily shift templates from the available ones, using measures such as "coverage", and break scheduling rules to schedule daily breaks (U.S. Pat. No. 5,911,134, col. 18, lines 26-46, and FIG. 11). The Castonguay method also includes post-processing steps to eliminate the redundant tours, level break times, and take employee preferences into consideration. The staffing model used in this method, Erlang C, is known to assume all callers will wait until they are served and will not abandon their calls. This is clearly not the case at call centers where impatient customers may terminate their calls before being served. Moreover, the Castonguay method generates agent schedules using simple heuristic rules.

U.S. Pat. No. 6,044,355 issued on Mar. 28, 2000 to Crockett et al. ("Crockett method") describes a method for developing weekly tour schedules in a contact center environment involving multiple agent groups with a plurality of skill sets, and a plurality of contact groups requiring different agent skills. The Crockett method uses a scheduler and a simulator to determine a net staffing array that gives the difference between the staffing levels already scheduled and those that are required in each planning period in the current iteration. It also uses a skill group availability matrix that describes the percentage of time agents in a skill group serve contacts in a contact group. The Crockett method's scheduler then takes these two inputs to generate additional schedules using heuristic rules. These schedules are then simulated to modify the group availability matrix and the net staffing array.

Atleson et al. (2004 and 2008) considered the staffing and scheduling problems using an Integer Programming model, namely the set covering model of Dantzig (1954), enumerating all possible shift start and break start times together with the work and off day patterns. They considered simulation for estimating service levels in different periods. The method ("Atleson method") is limited in a number of ways. First, it is developed for a non-skills based staffing and scheduling environment. Second, it uses the set covering model for schedule optimization that is known to require a large number of decision variables in scheduling agents at most contact centers, making its solution inefficient or infeasible. The Atleson method also ignores break schedules for agents.

BRIEF DESCRIPTION OF THE DRAWINGS

For a more complete description of the present invention and its merits, reference should be made to the Description of the Preferred Embodiment.

FIG. 2 shows all possible work patterns in a week.

SUMMARY OF THE INVENTION

Figure 1:
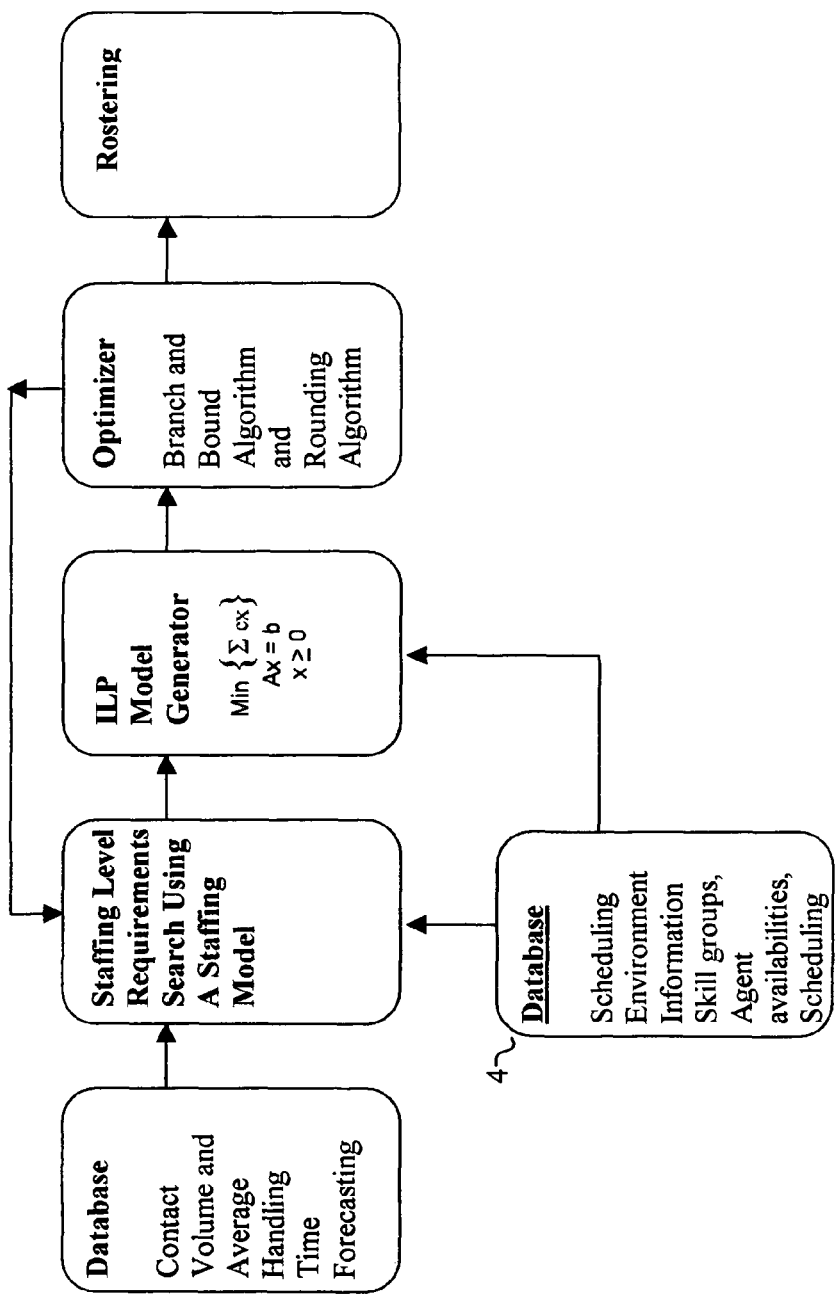
FIG. 1 shows the process architecture for staffing and agent scheduling with the system of the present invention.

It is the primary object of the present invention to provide a computer implemented method and system for staffing and agent scheduling in both skills-based and non-skills based environments. The computer implemented method and system of the present invention use simulation to determine the agent requirement for a skill group in a planning period. This is repeated for all planning periods covered by a scheduling period. By simulating the contact center environment with skills-based routing rules and other characteristics, the present invention captures the effects of multi-skill agents on service levels. For schedule optimization, the computer implemented method and system of the present invention uses an Integer Programming model.

The system of the invention (FIG. 1) consists of i) a database storing the needed data comprising of contact groups, contact volume and average service time forecasts, contact routing rules, skill groups, agent skills, number of agents and agent tour groups and weekly work hours ("agent availabilities") in each skill group, and scheduling rules, ii) a simulator for simulating a contact center environment, iii) an Integer Linear Programming (ILP) model generator, iv) a schedule optimizer-, and v) a rostering module for assigning the schedules to agents based on one or more user-specified criteria.

In the initialization step, the computer implemented method and system of the invention begins by acquiring required data. To obtain the initial agent schedules, agents in each skill group are scheduled for the contact group for which they have the highest skill level for or for which they have a unique skill (i.e. a skill that no other skill group has). Agent requirements for such contact groups are determined using a staffing model, an approximation, simulation or some other method. Using the agent requirements, the ILP model generator of the computer implemented method and system of the invention generates the ILP model to be optimized for this skill group. The branch and cut algorithm and the rounding algorithm of the computer implemented method and system of invention are then applied to the ILP model to find a solution. The solution of the ILP model is used to generate detailed agent schedules.

The computer implemented method and system of the present invention selects the skill group with the highest number of skills to schedule its agents first. A tie between skill groups is broken in favor of the group with the highest skill levels or the fewest agents. After agents in this top skill group are scheduled, agents in the next highest skill group are considered. This process is continued until all skill groups are scheduled. Thus, an initial set of schedules is obtained. These schedules are analyzed to determine the number of agents working in each skill group in each planning period (interchangeably referred to as "agents-on-duty" or "AOD") by counting the number of agents who are scheduled to work and not on a break.

After the initialization step, the computer implemented method and system of the invention begin iterations. In each iteration, the computer implemented method and system of the invention reschedule all skill groups, one at a time, as follows. The method unschedules agents in a skill group while keeping the schedules and AOD counts for the other skill groups at their current values, and simulates the contact center environment. The simulation step searches for the minimum agent requirement in each planning period for the skill group that was unscheduled to meet the service level targets for all contact groups that its staffing level affects. When the simulation run is completed, updated agent requirements for the unscheduled skill group are available. With the updated agent requirements, schedules for the agents in the unscheduled skill group are reoptimized using the ILP model. In this manner, the method of the invention continues by unscheduling one skill group at a time, updating the agent requirements for the agents in that skill group using simulation, and reoptimizing agent schedules. Iterations continue until a termination criterion is met.

The method of the invention uses a discrete event simulator to search for the agent requirements in each planning period for the skill group considered. It generates contact arrivals for all contact groups randomly, tracks agent activities and availability, simulates skills-based routing rules and collects statistics. It further uses a sub-gradient search approach (Bazaraa and Shetty, 1979) to determine the minimum agent requirements for the skill group considered.

To schedule agents in a skill group, the method of the present invention uses an ILP model generator. The model generator generates the constraints and variables. The optimizer of the method of the invention uses a branch and cut algorithm and a rounding algorithm based solution method to determine an optimal or near-optimal solution to the ILP model. A solution of the model provides the information needed to develop an optimal or near optimal set of agent schedules in a skill group.

Other features of the computer implemented method and system of the invention are described below for a contact center environment. The application of the invention to contact centers is merely illustrative, and it should be clear to those skilled in the art that the invention can be advantageously applied to other service systems.

DESCRIPTION OF THE PREFERRED EMBODIMENT

The following notation is used to describe the method of the invention.

- h is the day index, h=1, . . . , 7.
- $T_h$ is the set of planning periods on day h,
- t is the planning period index, $t \in T_h$,
- K is the number of contact groups,
- k is the contact group index, k=1, . . . , K,
- $\lambda_{kht}$ is the forecasted number of contacts or arrival rate (also called "contact volume") for contact group k in planning period t on day h, k=1, . . . , K, and $t \in T_h$,
- $o_{kht}$ is the forecasted average handling time or "AHT" per contact of contact group k in planning period t on day h, k=1, . . . , K, and $t \in T_h$,
- $\mu_{kht}$ is the service rate for contact group k in period t on day h, $\mu_{kht}=1/o_{kht}$, k=1, . . . , K, and $t \in T_h$.

To facilitate the description of the method of the invention, any variable or set defined with a subscript is shown as flat text when the variable or set itself is a subscript of another term. For example, the set of planning periods on day h, $T_h$, is typed as Th in $\Sigma_{t \in Th}$ where it is a subscript of the summation sign $\Sigma$. Moreover, symbols "$\epsilon$" and "$\in$" both imply membership in a set or an element of a set.

Although the description of the computer implemented method and system of the present invention assumes that a unique skill is needed for each contact group, the invention is not so limited. For example, sales questions regarding different products may form different contact groups but may require the same skill (e.g. sales skill). Alternatively, different sales contact groups may be answered by different skills.

It should be clear to a person with ordinary skills in the art that the method for updating the required staffing levels to meet service level targets for contact groups served a by skill group may include one or more staffing models. For example, this step may be applied using other staffing models including extended or approximate queuing models, fluid dynamic models, modified Erlang models, or some other model or method for estimating staffing levels. In one embodiment, a discrete event simulator is used to analyze the staffing level requirements given the contact volume and average service level forecasts, contact routing rules, and agent availabilities, skills and skill levels.

The method of the invention comprises of the initialization step and iterative step including simulation and scheduling. The simulation and scheduling sub-steps are repeated in an iterative manner as the schedules and resulting service levels are updated.

Initialization Step

The computer implemented method and system of the invention first retrieves data on contact groups comprising of contact volume and AHT forecasts for each planning period together with service level targets, operating hours, and routing rules from a database. Likewise, data on agent skill groups is retrieved including information concerning the agents' skills and skill levels, and their availability from the database. Scheduling rules for an agent specifies, among other things, the number of work and off days, shift length, number of breaks and their lengths, earliest break start times and break flexibility (also called breaks slack or window, allowing flexibility in scheduling a break), number of consecutive days off, and minimum and maximum number of weekend days off. Other scheduling requirements and constraints may include restrictions on possible daily shift start times, daily shift lengths, whether the daily shift start times and/or break start times of an agent should be consistent (i.e. identical on different work days) or variable, and whether there are minimum work requirements between breaks before the next break can begin.

The method of the invention starts the search for staffing levels and agent schedules by ordering skill groups from the group with the maximum number of skills (i.e. $\max_{i \in SG} S_i$) to the group with the fewest number of skills. Thus, each skill group $j \in SG$ has a rank R(j) with a value from 1, the highest ranking, to n, the lowest ranking, when there are n distinct skill groups. In case of a tie, the skill group with the smaller number of agents is ranked higher.

The method begins with the skill group with most skills, say j, i.e. R(j)=1. Let the set of contact groups that can be served by the skills of the skill group with a rank of j be $CG_j = \{k; k \in S_j, k=1, \ldots, K\}$. To determine the initial staffing level for skill group j, the computer implemented method and system of the invention considers the set of target contact groups $TG_j$. The set of target contact groups $TG_j$ for skill group j is determined by including: i) the contact group for which skill group j has the highest skill level among its skills, and ii) all other contact groups served by this skill group only (unique skills). In case of a tie (e.g. two skills both at level 1)

for the contact group with highest skill level, the contact group with most workload is selected. Workload due to contact group k in planning period t, t∈$T_h$, on day h is calculated as $w_{kht}=(\lambda_{kht}/\mu_{kht})$/(length of a planning period) or $w_{kht}=(\lambda_{kht} o_{kht})$/(length of a planning period).

Given the contact groups in $TG_j$, the method of the invention uses a staffing model allowing customer abandonments and a square root approximation to determine the number of agents required to meet the service level targets if the skill group considered alone serves the target contact groups in $TG_j$. For this purpose, the observed customer abandonment tendency measured by the computed abandonment percentage and the waiting time is used with the service level target. Observed customer tendency to abandon contacts is specified by the customer abandonment probability of $Ab_{kht}$ at a waiting time of $q_{kht}$ for each contact group k in period t on day h, k=1, . . . , K, and t∈$T_h$. These parameters are calculated from the historical data for each contact group, which is stored in the database of the system of the present invention.

Given the call volume and AHT forecasts, service level targets, abandonment probability $Ab_{kht}$ at a waiting time of $q_{kht}$ for each contact group k in $TG_j$, the method of the invention computes the required staffing $u_{kht}$ to meet the service level target in each period t and day h. $u_{kht}$ is the staffing level needed to meet the service level target for contact group k with single-skilled agents in period t on day h. This is repeated for all contact groups in $TG_j$. The combined staffing level for agents with skills for all contact groups in $TG_j$ in period t on day h is then calculated using the following approximation.

$$b^0_{jht}=\Sigma_{k\in TGj}w_{kht}+\{\Sigma_{k\in TGj}(u_{kht}-w_{kht})^2\}^{1/2} \quad (1)$$

where $b^0_{jht}$ is the initial staffing level for skill group j. The staffing level calculated in this step an approximation for agent requirements for agents in skill group j for contact groups in $TG_j$. These approximate staffing levels are refined by the method and system of the invention in the iterative step to meet the service level targets for all contact groups as described below.

The use of a queuing model allowing customer abandonments in this step of the method is illustrative only. The method and system of the invention can also be applied using other staffing models including the well known Erlang C model assuming no customer abandonment or using simulation.

In order to schedule agents in skill group j, the model generator of the computer implemented method and system of the invention takes the agent requirements calculated for skill group j, and availabilities of the agents in the skill group and develops an ILP model. The Model Generator of the system of the invention generates an objective function, constraints and decision variables. A solution of the model provides the information needed (e.g. values for the decision variables) to develop an optimal or near optimal set of schedules for the agents in skill group j. The ILP model and solution method are described later in this document.

After scheduling agents in skill group j to meet agent requirements for the target contact groups, if there are still unscheduled agents in skill group j due to excess agent availability, they are considered for other contact groups for which they have skills to serve.

The method and system of the invention then considers the skill group ranked next, and applies the same steps. That is, the set of target contact groups is identified, and agent requirements for these contact groups are determined using a staffing model. Using initial agent requirements, the model generator of the system of the invention generates an ILP model with constraints and variables to satisfy all scheduling rules and agent availabilities in scheduling agents. It then applies the solution method to the ILP model to obtain a solution. Next, schedules for the agents in this skill group are generated. This process is continues until all skill groups are scheduled.

If each skill group has only one unique skill serving only one contact group, and if each contact group is served by one skill group exclusively, the staffing and scheduling environment is a non-skills based one. In that case, the method of the invention will terminate upon completion of the initialization step.

Likewise, in a skills-based routing environment, if there are skill groups with only a single skill, with each serving a contact group that is not served by any other skill group, they are called "stand-alone" skill groups. Their schedules are not updated after the initialization step since they won't be affected by skills-based routing or efficiencies created by multi-skilled agents.

When all skill groups are considered and scheduled in the initialization step, and there are multi-skilled agents operating in a skills-based routing environment, the method of the invention starts the iterative step.

Iterative Step

The iterative step of the method and system of the invention consists of two sub-steps that are repeated for each skill group once in each pass. Each pass of the iterative steps is called an "iteration". These sub-steps are i) simulation to update agent requirements, and ii) re-scheduling. In each iteration, all skill groups are rescheduled, one at a time, to generate new schedules and service levels. For this purpose, the method of the invention first considers the skill group with the most skills. This is the highest ranking skill group with R(j)=1. All agents in this group are unscheduled by discarding their schedules found in the last iteration, or the initialization step if this is the first iteration, while agents in all other skill groups are treated as scheduled and working their current schedules. For each skill group k other than j, agents-on-duty (AOD) counts are calculated for each planning period from the current agent schedules. Let $AOD_{kht}$ be the number of agents from skill group k who are scheduled to be on duty (that is, at work and not taking a break) serving customers in planning period t on day h. Given $AOD_{kht}$ for all skill groups except skill group j, the method and system of the invention simulates contact center environment (that is, contact arrivals, service and abandonments, routing rules, agent activities, etc.) in the simulation sub-step via a discrete event simulator. In the simulation sub-step, the computer implemented method and system of the invention searches for the agent requirements for skill group j that are needed to meet service level targets for all contact groups affected by this skill group's staffing levels. When agent requirements for skill group j are determined over the scheduling period, schedules for agents in skill group j are optimized to meet them in the re-scheduling sub-step.

The simulator of the method and system of the invention uses discrete event simulation (Law et al., 2000). In searching for agent requirement for skill group j in period t on day h, the simulator starts with an initial agent requirement level $b_{jht}$ and adjusts it in an iterative manner using a sub-gradient search algorithm until the minimum agent requirement with simulated service levels meeting or exceeding the service level targets for all contact groups whose service levels are affected by this skill group's staffing level is found. This is repeated for every planning period in $T_h$, h=1, . . . , 7. This sub-step considers not only the contact groups served by skill group j but also the contact groups whose service levels are affected by this skill group's staffing levels. Agents scheduled for skill group j would affect the service levels of contact groups that are not served directly by these agents if there are one or more other skill groups that serve both these contact groups and one or more contact groups served by skill group j.

Given agents-on-duty counts, $AOD_{kht}$, for skill groups other than j, the simulator of the method and system of the invention includes all contact groups and simulates contact arrivals, and service times according to the contact volume and AHT forecasts retrieved from the database for the scheduling period. Queues and contact routing rules (e.g. longest idle agent, longest waiting call, highest skill level) are applied as specified for the contact center environment. Depending on the contact center environment, routing rules may include several steps and conditions. The simulator also simulates contact abandonments based on the observed customer tendency to abandon.

Specific instances of interarrival times between successive arrivals of contacts from a contact group according to the forecasted contact arrivals, and service times from forecasted AHT and customer abandonment thresholds for these contact interarrival times are generated randomly according to their probability distributions. Abandonment threshold provides a limit for customer patience. The simulator will consider a contact abandoned when the waiting time exceeds this value. To generate these times, the simulator uses a random number generator and their probability distributions. The random number generator provides a series of random numbers starting with an initial value (called the "seed"). When different seeds are used, the random number generator provides different sequences of random numbers.

Each planning period is simulated a number of times using different seeds to collect performance statistics. Each such simulation of a planning period with a distinct seed is called a replication.

After completing the desired number of replications, performance statistics are calculated. Calculated performance statistics include the percentage of contacts abandoned answered within the service level threshold (service level), percentage of contacts abandoned before being served by an agent, average speed of answer for answered contacts, and agent occupancy. Other statistics such as the number of contacts received, answered, abandoned and waiting, average service time are also calculated. To obtain an estimate of the performance, these measures are averaged for all replications. Based on the average performance from these replications, if the service level targets for the contact groups served or affected by skill group j are met in the planning period, the simulator stores the results in the database and considers the next planning period. When service level targets for one or more contact groups served or affected by skill group j are not met, the simulator uses the sub-gradient algorithm to adjust agent requirements for the period, $b_{jht}$, and repeats the simulation.

In each planning period, the sub-gradient search algorithm starts with an initial estimate of the agents required for the skill group being considered for rescheduling using a staffing model. There are a number of ways of obtaining an initial staffing requirement for a skill group including using a non-skills based staffing model and square root approximation (1) described before, or the staffing level from a planning period already simulated.

It is known that the service level for a contact group increases following an S-shaped curve with the staffing level. That is, for low levels of staffing, the service level function is a convex function of the staffing level and becomes a concave function beyond a certain level. Setting the initial staffing level using the method of the invention attempts to avoid the convex part of the service level function when possible.

Due to agents scheduled in other skill groups, it is possible that the method used for determining the initial staffing level, $b_{jht}$, may overestimate the agents required in a certain period. When this happens, after the first simulation pass with the initial staffing level, the method of the invention lowers $b_{jht}$ until a staffing level is found with at least one contact group (whose service level is affected by this skill group's staffing level) with a service level less than its target before it starts the search for the minimum number of agents required for skill group j to meet its service level targets. The sub-gradient search for the required staffing level in a period is stopped when a staffing level that results in service levels above their targets for all contact groups served or affected by skill group j is found such that a service level less than the target would result for at least one of these contact groups if the agent requirement is lowered by one unit.

Let the service level observed for contact group 1 in planning period t on day h with $b_{jht}$ agents in skill group j and $AOD_{kht}$ agents in other skill groups, $k \in SG$ and $k \neq j$, be $SL_1$ $(b_{jht})$. If the service level target for every contact group served by skill group j and all other contact groups affected by changes in the staff level of this skill group including contact group 1 are met, simulation of the period is complete unless it is determined that the staffing level was overestimated. When the last increase in staffing level is more than one unit, the new staffing level is tested by lowering it one unit at a time in an iterative manner to determine if the service level targets are still satisfied for the same contact groups. When there is no overstaffing in the staffing level found for skill group j in period t, the simulator analyzes the next planning period (t+1).

When the service level targets for one or more contact groups whose service levels are affected by the staffing levels of skill group j are not met, its staffing level in the planning period simulated is increased. Let the set of contact groups whose service level targets are not met at the current staffing level, $b_{jht}$, be $U_j$. The method of the invention next determines sub-gradients by increasing the staffing level for skill group j in planning period t to $\{b_{jht}+a\}$ where $a \geq 1$ and an integer representing the additional staffing. This new staffing level and the previous one are used to determine a sub-gradient of the service level function of each contact group in $U_j$.

The method repeats the simulation step with $\{b_{jht}+a\}$ as the staffing level for skill group j. Sub-gradients of the service levels for the contact groups in $U_j$ are then calculated as $$G_1(b_{jht}) = \{[SL_1(b_{jht}+a) - SL_1(b_{jht})]/a\}, 1 \in U_j. \quad (2)$$

If $G_1(b_{jht})$ is not greater than zero for at least one contact group in increasing staffing level $b_{jht}$ for skill group j further may not improve service levels in this planning period. However, it is possible that service levels for contact groups in $U_j$ may not improve with a small increase in the staffing level, a, due to the nature of discrete event simulation. In this case, the method and system of the invention increases the staffing level further (e.g. if a=1 originally, it tries a=2, 3, or higher values) and repeats simulation with the new increased staffing level. If, with the further increased staffing level, $G_k(b_{jht})$ is still not greater than zero for at least one contact group in $U_j$, increasing staffing level for this skill group would not improve service levels. The method and system of the invention checks the amount of last increase in staffing level considered before terminating the search for this planning period to prevent overstaffing. If the last increase in staffing level was greater than one, the simulator reduces the staffing level by one. The method then determines whether the reduced staffing level would cause a service level lower than the service level target for at least one contact group whose service level target was met or exceeded before the staffing level reduction. If it does, the last staffing level is restored and the search for the staffing level for skill group j in planning period t is terminated. If the reduced staffing level does not result in a service level lower than the target for any contact group in $U_j$, then it is further reduced until service levels for one or more contact groups are lower than their service level targets. When this happens, the staffing level before the last reduction is restored and the search for the staffing level for skill group j in this planning period is terminated.

If $G_1(b_{jht})$ is greater than zero for at least one contact group in $U_j$, increasing the staffing level for skill group j may improve service levels in this planning period. The new staffing level for skill group j is set to $$b_{jht} = b_{jht} + \max_{1 \in Uj} \{\|[v_{1ht} - SL_1(b_{jht})]/G_1(b_{jht})\|\} \quad (3)$$

where $\|.\|$ is a function that returns the greatest integer smaller than or equal to its argument. Simulation is then repeated for planning period t with the new staffing level.

The iterative sub-gradient search of the method and system of the invention is repeated while increasing the staffing level $b_{jht}$, as described above, until i) all service level targets for all contact groups in Uj are met, or ii) $G_k(b_{jht}))$ is less than or equal to zero for all contact groups in $U_j$. In either case, the simulator terminates the search for the staffing level for skill group j in planning period t, and starts the next planning period (t+1).

When the simulator of the method and system of the invention completes the analysis of all planning periods in $T_h$, h=1, . . . , 7, updated required staffing levels $b_{jht}$ for all planning periods in the scheduling period are known for skill group j. The method of the invention next initiates the re-scheduling sub-step to generate the ILP model. The ILP model requires the staffing levels generated by the simulator, and all scheduling rules stored in the database of the system of the invention. The model is solved for agent schedules. Upon generation of a solution to the ILP model, optimized agent schedules and agents-on-duty counts $AOD_{jht}$ are determined, $t \in T_h$, h=1, . . . , 7, for skill group j. The simulation and rescheduling sub-steps are repeated in for every skill group from the one with the most skills to the one with the least.

Each time when an iteration of the method of the invention is completed, schedules for agents in each skill group are updated. To update the service levels expected with the new schedules, the simulator is run one more time with the updated $AOD_{jht}$ values for all skill groups at the end of each iteration. This is called the "performance evaluation" pass. The performance evaluation pass completes an iteration with the updated agent schedules and service levels. Services levels found during the performance evaluation pass for all contact groups are stored as the service levels with the updated schedules at the end of that iteration.

Service levels for all contact groups in successive iterations are compared and the method of the invention terminates the iterative step with the final schedules ("final schedules") if one or more stopping rules are satisfied. The method of the invention stops, for example, when i) the difference in service levels in the two successive iterations is less than a small value (e.g. 1%) for all contact groups, ii) the maximum number of iterations specified is exceeded, or iii) the total time allowed for iterations is exceeded.

As described before, the simulator makes several replications to refine the service level estimates for each planning period. The computer implemented method and system of the invention uses a variance reduction technique known as the Common Random Numbers technique (Law et al., 2000).

It should be clear to a person with ordinary skills in the art that the simulation sub-step can be modified in a number of ways. For example, the simulation can be carried out with other variance reduction techniques (Law et al., 2000) or no variance reduction technique. Moreover, the sub-gradient search of the method and system of the invention for determining the required staffing level for a skill group in a time period, $b_{jht}$, can be applied using measures other than service level. For example, the service level in an planning period is the ratio of the number of contacts answered within service level threshold $\Delta_{kt}$ to the total number of contacts received during the planning period. The sub-gradient calculation can be carried out using the number of contacts answered within the service level threshold. Likewise, maximum abandonment percentage, average speed of answer or agent occupancy performance targets can be used in place of service level to calculate sub-gradients. Moreover, two or more performance targets may be required for some contact groups. For example, service level targets for contact groups and maximum abandonment percentage target may together be specified. These variations of the method and system of the invention are also within the scope of the present invention.

ILP Model for Agent Scheduling in a Skill Group

Let QK be the set of all tour types. Assume that agents assigned to tour type k can start at any one of a set of predetermined start times on day h given in $QI_{kh}$. If a tour type permits multiple daily start times but requires identical ("consistent") ones on different days for each agent, the tour type is split by defining a new tour type for each allowable daily start time so that each newly defined tour type m has one daily start time in $QI_{mh}$ on all days. For example, a tour type may require consistent start times with permissible start times $QI_{kh} = \{8: 30, 8:45, 9:00, 9:15, 9:30, 9:45\}$. Two agents assigned to this tour type may have the following schedules: agent 1 may have an 8:30 start time on all of his/her work days, agent 2 may have a 9:45 on all of his/her work days over the scheduling period. To meet the consistent start time requirement with the start times allowed, this tour type is split into six tour types, one for each daily start time. Thus, the newly created tour types will have the daily as follow: $QI_{1h} = \{8:30\}$, $QI_{2h} = \{8: 45\}$, $QI_{3h} = \{9:00\}$, $QI_{4h} = \{9:15\}$, $QI_{5h} = \{9:30\}$, and $QI_{6h} = \{9: 45\}$ for all h=1, . . . 7. All other scheduling rules defined for the tour group requiring consistent start times also apply to the newly created tour types in this way. All newly created tour types are included in QK.

If a tour type allows for variable daily shift start times, then $QI_{mh}$ has two or more start times on one or more days h within the scheduling period. The daily shift start times on consecutive days can not permit overlapping shifts or back-to-back daily shifts for agents without allowing enough time to rest. Thus, the latest start time for an agent assigned to a tour type plus the length of the daily shift length and the desired minimum rest period between consecutive shifts should not pass beyond the earliest start time scheduled for the agent on the following day.

Agents in a skill group may be located at a plurality of contact center locations with different operating hours. Daily start times permitted for a tour type are also affected by the local contact center operating hours. While some daily start times permitted for a tour type may be available for agents at one location, they may not be available to agents at another location if starting at such times may require work beyond the center closing time. Thus, start times are further specified for local centers to accommodate the operating hour differences.

Let the set of the daily shift lengths allowed for tour type k be $F_k$. It is possible to modify the notation to permit $F_k$ to change from one day to another. If a tour requires the same shift length for every work day, then $F_k$ will have only one shift length. A tour has a minimum weekly work (hours) limit specified by the shortest shift in $F_k$ times the minimum number of work days required, and a maximum weekly work (hours) limit specified by the longest shift in $F_k$ times the maximum number of work days.

To simplify the notation, the ILP model of the method and system of the invention is described for tours that have three daily breaks: two relief breaks, and one lunch break. Moreover, the ILP model described below is for a case in which the first and third breaks are one planning period, and the second break (lunch break) is two planning periods in length. Depending on the shift length, more or less than three breaks may be provided. A break may also be any number of planning periods (shorter than or equal to the daily shift length) in length. Tours with more or less than three daily breaks as well as break durations of one, two or more planning periods are easily included in the ILP model by introducing new break variables and constraints similar to the ones for the three breaks described below. Likewise, if a tour has fewer than three daily breaks, related variables and constraints for breaks not allowed are excluded in the ILP model.

Daily relief and lunch breaks must start and end within the break windows specified for them. These windows specify all possible break start times for breaks to be scheduled as part of the scheduling rules for a tour type.

There may also be constraints on work and off days ("work and off day rules") that can be scheduled for a tour type. These constraints may require, for example, a minimum number of weekend days off, a minimum number of consecutive days off, must-work days, and fixed days off or center closed days (e.g. a center may be closed on Sundays). These restrictions are applied in indentifying feasible weekly work patterns. All possible work patterns for tours permitting one to seven off days in a week are shown in FIG. 2. A work pattern in this case is a string of zeros and ones indicating work days (=1) and off days (=0) for agents scheduled to this work pattern. A work pattern thus specifies work and non-work days explicitly. Scheduling rules specified for each tour type are applied by the method and system of the invention to select the work patterns satisfying them from this table.

The method of the invention generates an ILP model for agents in one skill group at a time. To facilitate the presentation of the ILP model, the skill group index is not included in the notation used for variables below. All variables, coefficients and constraints defined are for a skill group in SG. The following notation is used to describe the ILP model of the invention.

$QX_{knhi}$ is the number of agents assigned to tour k with shift length n and a starting time of period i on day h, $QU_{kniht}$ is the numbers of agents assigned to tour k with shift length n and a daily start time of i on day h, and starting their first relief breaks in period t, $QW_{kniht}$ is the numbers of agents assigned to tour k with shift length n and a daily start time of i on day h, and starting their lunch breaks in period t, $QV_{kniht}$ is the numbers of agents assigned to tour k with shift length n and a daily start time of i on day h, and starting their second relief breaks in period t, $QB1_{knih}$ is the set of planning periods during which an employee assigned to tour k with shift length n and a daily start time of planning period i on day h may start his/her first relief break within the time windows specified for this break, $QB2_{knih}$ is the set of planning periods during which an employee assigned to tour k with shift length n and a daily start time of planning period i on day h may start his/her lunch break within the time windows specified for this break, $QB3_{knih}$ is the set of planning periods during which an employee assigned to tour k with shift length n and a daily start time of planning period i on day h may start his/her second relief break within the time windows specified for this break, $QT1_{knht}$ is the set of daily start times for shift length n for tour k for which planning period t on day h is a first relief break start period, $QT2_{knht}$ is the set of daily start times for shift length n for tour k for which planning period t on day h is a lunch break start period, $QT3_{knht}$ is the set of daily start times for shift length n for tour k for which planning period t on day h is a second relief break start period, $a_{kniht}$ is equal to one if planning period t on day h is a work period for agents assigned to tour k who have the start time of planning period i and shift length n on day h, and zero otherwise, $QL_k$ is the set of all work patterns satisfying the work and off day rules for tour k, $Q_{k1}$ is the number of agents assigned to tour k with work pattern l, $QD_k^{max}$ is the maximum number of agents available to assign to tour k, $QD_k^{min}$ is the minimum number of agents must be scheduled ("must-work agents") for tour k, $A_{k1h}$ is equal to one if day h is a work day for agents assigned to work pattern l for tour k, and zero otherwise, $C_{k1}$ is the weekly "fixed" cost (e.g. benefits, etc.) of assigning an agent to tour k with work pattern l, $c_{knhi}$ is the daily wage paid to agents assigned to tour type k with shift length n and start time of planning period i on day h, $b_{ht}$ is the number of agents (staffing level) required in period t on day h, $B_{ht}$ is the number of agents by which the agents-on-duty scheduled is less than ("agent shortage") the number of agents required in planning period t on day h, $O_{ht}$ is the number of agents by which the agents-on-duty scheduled is greater than ("agent excess") the number of agents required in planning period t on day h, $P_{ht}$ is a large positive penalty cost for having agent shortages. Penalty cost $P_{ht}$ is set to a large enough value to make sure that shortage variables $B_{ht}$ are zero when there is sufficient agent availability to meet all agent requirements, The method of and system of the present invention creates the following ILP model to a skill group $$\text{Minimize } \Sigma_{k \in QK} \Sigma_{l \in QLk} C_{k1} Q_{k1} + \\ \Sigma_{k \in QK} \Sigma_{n \in Fk} \Sigma_{h} \Sigma_{i \in QIkh} c_{knhi} QX_{knhi} + \Sigma_{t \in Th} \Sigma_h P_{ht} B_{ht} \quad (4)$$

Subject to $$\Sigma_{k \in QK} \Sigma_{n \in Fk} \Sigma_{i \in QIkh} a_{kniht} QX_{knhi} - \\ \Sigma_{k \in QK} \Sigma_{n \in Fk} \Sigma_{i \in QT1knht} QU_{kniht} - \\ \Sigma_{k \in QK} \Sigma_{n \in Fk} \Sigma_{i \in QT2knht} (QW_{kniht} + QW_{knih(t-1)}) - \\ \Sigma_{k \in QK} \Sigma_{n \in Fk} \Sigma_{i \in QT3knht} QV_{kniht} + B_{ht} - O_{ht} = b_{ht}, \, t \in T_h, \\ h = 1, \ldots, 7, \quad (5)$$

$$QX_{knhi} = \Sigma_{t \in QB1knih} QU_{kniht}, \, n \in F_k, \, i \in QI_{kh}, \\ k \in QK, \, h = 1, \ldots, 7, \quad (6)$$

$$QX_{knhi} = \Sigma_{t \in QB2knih} QW_{kniht}, \, n \in F_k, \, i \in QI_{kh}, \\ k \in QK, \, h = 1, \ldots, 7, \quad (7)$$

$$QX_{knhi} = \Sigma_{t \in QB3knih} QV_{kniht}, n \in F_k, i \in QI_{kh},$$
$$k \in QK, h=1, \ldots, 7, \quad (8)$$

$$\Sigma_{l \in QLk} A_{k1h} Q_{k1} = \Sigma_{n \in Fk} \Sigma_{i \in QIkh} QX_{knhi}, k \in QK, h=1, \ldots, 7, \quad (9)$$

$$\Sigma_{l \in QLK} Q_{k1} \leq QD_k^{max}, k \in QK, \quad (10)$$

$$QX_{knhi}, Q_{k1}, QU_{kniht}, QW_{kniht}, QV_{kniht}, B_{ht}, \text{ and } O_{ht} \geq 0 \text{ and integer for all } k, n, i, h, \text{ and } t. \quad (11)$$

An ILP formulation (the terms "model" and "formulation" are used interchangeably in this patent document) consists of decision variables, objective function, constraints, and parameters as in model (4-11). Decision variables represent various activities, and decisions regarding the values they should take. In an ILP formulation, all decision variables are restricted to integer values only. One objective in formulating an ILP model such as (4-11) is to determine the values for decision variables that minimize its objective function value while satisfying its constraints. Values a decision variable can take are limited by the constraints of the ILP formulation. A set of values for decision variables satisfying all constraints of an ILP formulation is called an integer feasible solution ("integer feasible solution") to the formulation. An integer feasible solution that provides the best value for the objective function of an ILP formulation over all possible integer feasible solutions is called an optimal solution (Taha, 1987). In the ILP formulation (4-11), decision variables include $QX_{knhi}, Q_{k1}, QU_{kniht}, QW_{kniht}, QV_{kniht}, B_{ht},$ and $O_{ht}$ for all k, n, i, h, and t. Constraints are given in (5-12), and the objective function in (4).

When all integrality constraints in an ILP formulation (integrality requirements in constraints (11)) are relaxed, the resulting model is referred to as the Linear Programming relaxation ("LP relaxation"). A set of values satisfying all constraints except the integrality constraints of an ILP formulation is a feasible solution to its LP relaxation. An optimal solution to the LP relaxation may or may not satisfy the integrality constraints of the original ILP model. If an optimal solution to the LP relaxation of an ILP formulation also satisfies all of its integrality constraints, it is also an optimal solution to the ILP formulation (Taha, 1987).

In the ILP formulation presented in (4-11), objective function (4) is the total cost of assigning agents to various tour types, work patterns, shift lengths and start times over the scheduling period. It also includes a penalty (cost) term for agent shortages. Constraint (5) ensures that the total number of agents assigned to various shifts and available in period t on day h (first term on the left side of (5)) minus the number of agents who are assigned to these shifts but taking their first relief, (second term on the left side of (5)), lunch, (third term on the left side of (5)), and second relief, (fourth term on the left side of (5)) in period t on day h plus the agent shortage term (fifth term on the left side of (5)) minus the excess agent term (sixth term on the left side of (5)) in this period is equal to the agent requirement $b_{ht}$. To facilitate the presentation of constraint (5), planning period index (t−1) is used in describing a two-planning-period lunch break. If (t−1) is in one day and planning period t is in the next day, planning period and day indexes are adjusted accordingly. For example, if a planning period is 15 minutes long and period 96 is the starting period for a lunch break variable corresponding to a 30-minute break on day h, then the second planning period for this variable is not period 97 (that is, 24 hours plus a 15-minute planning period), which is in the next day, but period one of day (h+1). Likewise if (h+1) is beyond the end of the scheduling period, schedules may "wrap around" and agent availabilities appear in the first planning period in the scheduling period. Likewise, if t=0 and h=1, then (t−1) is the last planning period of the previous day. That is, (t−1) is 96 on day h=7. This is the case when agent schedules are kept the same from one week to the next for a period of time. If schedules are optimized every week, then schedules from one week will not wrap around the scheduling period but will extend into the next week. Thus, an agent starting before the end of a week but continuing into the next because of the shift start time and length in the last day of the week will be counted as at work during the portion of the shift extending in to the following week. This is used to offset agent requirements in the planning periods during which agents continue their shifts from the previous week before generating schedules for the next week.

Break constraints (6-8) ensure that one first relief, one lunch, and one second relief break are scheduled for each agent who is assigned to tour k with a daily start time of planning period i and daily shift length of n on day h. Constraint (9) ensures that a shift is scheduled for every agent who is assigned to tour k and work pattern 1 on the days the work pattern requires work. Constraint (10) ensures that the total number of agents assigned to tour type k doesn't exceed the maximum number of agents that are available to assign to this tour type. Finally, constraint (11) restricts decision variables $QX_{knhi}, Q_{k1}, QU_{kniht}, QW_{kniht}, QV_{kniht}, B_{ht},$ and $O_{ht}$ to non-negative integers to avoid negative, and fractional agent values.

A solution of the ILP model using the branch and cut algorithm supplemented with the rounding algorithm generates schedules stored in the values of the variables used in the model. Let the optimized values for variables in (4-11) be $Q^*_{k1}, QX^*_{knhi}, QU^*_{kniht}, QW^*_{kniht}, QV^*_{kniht}, B^*_{ht},$ and $O^*_{ht}$. As described earlier, each skill group is rescheduled in each iteration of the method and system of the invention. When formulated for a skill group, say skill group j, the method of the invention obtains agent-on-duty counts for contact groups served by this skill group used in the simulation sub-step of the iterative step as follows.

$$AOD_{jht} = \Sigma_{k \in QK} \Sigma_{n \in Fk} \Sigma_{i \in QIkh} a_{kniht} QX^*_{knhi} - $$
$$\Sigma_{k \in QK} \Sigma_{n \in Fk} \Sigma_{i \in QT1knh} QU^*_{kniht} - $$
$$\Sigma_{k \in QK} \Sigma_{n \in Fk} \Sigma_{i \in QT2knh} (QW^*_{kniht} + QW^*_{knih(t-1)}) - $$
$$\Sigma_{k \in QK} \Sigma_{n \in Fk} \Sigma_{i \in QT3knh} QV^*_{kniht}, t \in T_h, h=1, \ldots, 7, \quad (12)$$

When a certain number of agents with tour type k must be scheduled to work ("must-work" agents), the minimum number of agents scheduled for tour k is constrained. This may be the case, for example, when there are full-time agents at a contact center who are paid regardless of whether or not they are scheduled. To schedule the required number of agents who must work, the following constraint is added to (4-11).

$$\Sigma_{l \in QLk} Q_{k1} \geq QD_k^{min}, k \in QK, \quad (13)$$

Constraint (13) ensures that, at a minimum, $D^{min}$ agents will be scheduled for tour type k regardless of whether they are needed to meet agent requirements, $b_{ht}$, in constraint (5). If no agent is classified as must-work, then $D^{min}=0$.

If a certain amount of overstaffing is needed, $f_h$, it is assured by the method of the invention by restricting the overstaffing to be greater than or equal to the desired level on day h.

$$\Sigma_{t \in Th} O_{ht} \geq f_h, h=1, \ldots, 7, \quad (14)$$

If a certain amount of understaffing is acceptable on day h, this is achieved by adding a similar constraint:

$$\Sigma_{t \in Th} B_{ht} \geq r_h, h=1, \ldots, 7, \quad (15)$$

where $r_h$ is the minimum amount of agent shortage desired on day h. When needed, (14) and (15) are modified to impose limits for one or more planning periods on day h.

The method of the invention modifies objective function (4) if the objective type selected is to minimize the total amount of agent time scheduled (or paid agent time) by setting $C_{k1}$ equal to zero and $c_{kni}$ to length of shift type n (or paid portion of the shift) in the number of hours for tour type k.

The ILP model of the invention is applied by adding more variables and constrains to schedule the correct number of breaks if more than three daily breaks are required to be scheduled for certain tour types. It uses one set of variables similar to $QU_{kniht}$, $QW_{kniht}$, and $QV_{kniht}$, and one set of constraints similar to constraints (6-8) to schedule each break type. The method of the invention introduces fewer variables and constraints to schedule correct number of breaks if fewer than three break types are required for a tour type. A break longer than two planning periods is modeled similar to the lunch breaks in constraint (7). In this case, break variables are subtracted from the left side of constraints (5) corresponding to all planning periods within the break duration (i.e when agents assigned to these breaks will not be working) specified by those variables.

Since valid work patterns are determined using the work and off day rules specified for each tour type in QK in advance for formulation (4-11), the minimum, maximum, and exact number of consecutive days off, total number of days off requirements, specific work days or off days, or the minimum and maximum weekend days off are enforced in the ILP formulation. All possible work patterns over a week are shown in FIG. 2. All work patterns in FIG. 2 that satisfy the work and days-off rules for tour k, k∈QK, are included in $QL_k$. Their coefficients $A_{k1h}$ are included in constraint (9). The list of possible work patterns shown in FIG. 2. is extended (or shortened) by enumerating all work and off day patterns if a scheduling period longer (or shorter) than one week is considered.

If a tour type has days off required for all agents assigned to it on certain days then all feasible work patterns selected for that tour type must have off days on those days. If working hours on certain days (e.g. Saturday) are shorter than the other days during the scheduling period for a tour or a contact center, the present invention applies the ILP model by excluding the daily shift start times and associated variables resulting in work times before the daily start time or a shift end time after the closing time for that tour or center on those days.

The method of the invention also determines staffing needs and schedules agents to meet service level objectives from contact channels such as email, and fax. These types of contact channels, called "multimedia contact channels", are different than phone-based or internet-based chat contact groups. While the waiting time of a caller is critical for a phone based contact group, the percentage of contacts replied to ever within a promised time period (response window) may be critical for these types of contact channels. Let $\Theta$ be the set of all such channels that are within the skill set of the skill group under consideration for scheduling. Given the forecasts of contact volumes and average service time per contact for channel i, i∈Θ, in time period t on day h, the total workload due to contacts expected in number of planning periods, $d_{ith}$, is calculated as $d_{ith}$={(contact volume forecast for channel i in planning period t on day h)×(average service time forecast per contact for channel i in planning period t of day h)}/(length of a planning period), where the average service time per contact and the length of a planning period are expressed in the same time unit. With a response window, workload due to the contacts received in a planning period can be allocated in to the other planning periods to optimize agent schedules, and minimize the total agent cost or paid agent time.

Let the response window in which to reply to a contact received via contact group i in planning period u on day h be $H_{iuh}$. A multimedia contact channel may have more than one response window. The length of the response window can change depending on the contact channel, the time of day, and the day of the scheduling period, etc. Let the set of planning periods whose response windows including planning period t on day h for channel i be $QP_{iht}$. Let $E_{iuht}$ be the number of agents required to complete the workload due to contacts received via contact group i in planning period u on day h allocated into planning period t. Workload variables $E_{iuht}$ are defined for u∈$T_h$, t∈$H_{iuh}$, h=1, ... 7. If services are offered for less than 24 hours a day, then $E_{ijht}$ is defined for only the planning periods during which the services can be offered within $H_{iuh}$. This may shorten the response window for the contacts received toward the end of an operating day. Alternatively, the service policy may permit carrying unserved contacts over to the next day and the response window may be specified accordingly. This is the when customers can still contact when no services are provided (i.e. emails received after closing time).

If the service target is to answer 100% of contacts received on time by the rescheduled skill group, the workload allocated over the response window must satisfy the following equation for planning period u: $E_{t∈Hiuh}E_{iuht}=d_{iuh}$. If less than 100% of the contacts for a multimedia contact group received in planning period u are targeted to be served during the service window by the skill rescheduled group, then the right side of this equation is multiplied by the percentage targeted. The number of agents needed to complete the total workload allocated into period t for channel i from other periods is then given by $\Sigma_{m∈QPiht}E_{imht}$.

Constrain (5) in the ILP model (4-11) is then formulated to include email/fax based contact workload together with the staffing needed for phone based contacts for this skill group as follows:

$$\Sigma_{k∈QK}\Sigma_{n∈Fk}\Sigma_{i∈Qlkh}a_{kniht}QX_{knhi}-$$
$$\Sigma_{k∈QK}\Sigma_{n∈Fk}\Sigma_{i∈QT1knht}QU_{kniht}-$$
$$\Sigma_{k∈QK}\Sigma_{n∈Fk}\Sigma_{i∈QT2knht}(QW_{kniht}+QW_{knih(t-1)})-$$
$$\Sigma_{k∈QK}\Sigma_{n∈Fk}\Sigma_{i∈QT3knht}QV_{kniht}+B_{ht}-O_{ht}=b_{ht}+$$
$$(\Sigma_{i∈\Theta}\Sigma_{m∈QPih}E_{imht}), t∈T_h, h=1, \ldots, 7, \quad (16)$$

The following constraints are also added to make sure that all workload due to these contact channels are planned for.

$$\Sigma_{t∈Hiuh}E_{iuht}=d_{iuh}, i∈\Theta, u∈T_h, h=1, \ldots, 7, \quad (17)$$

$$E_{iuht}\geq \text{for all } i∈\Theta, u∈T_h, \text{ and } h=1, \ldots, 7, \quad (18)$$

If there are multimedia contact channels, agent-on-duty counts for phone channels are calculated by subtracting the agents scheduled to answer emails. Let the optimized values for variables in formulation (4-11) after constraint (16) replacing constraint (5) and (17-18) added be $Q^*_{k1}$, $QX^*_{knhi}$, $QU^*_{kniht}$, $QW^*_{kniht}$, $QV^*_{kniht}$, and $E^*_{imht}$. As described earlier, each skill group is rescheduled in each iteration of the method of the invention. The computer implemented method and system of the invention obtains agent-on-duty counts for phone based contact groups for this skill group used in the simulator as follows.

$$\Sigma_{k∈QK}\Sigma_{n∈Fk}\Sigma_{i∈Qlkh}a_{kniht}QX^*_{knhi}-$$
$$\Sigma_{k∈QK}\Sigma_{n∈Fk}\Sigma_{i∈QT1knht}QU^*_{kniht}-$$
$$\Sigma_{k∈QK}\Sigma_{n∈Fk}\Sigma_{i∈QT2knht}(QW^*_{kniht}+QW^*_{knih(t-1)})-$$
$$\Sigma_{k∈QK}\Sigma_{n∈Fk}\Sigma_{i∈QT3knht}QV^*_{kniht}-$$
$$(\Sigma_{i∈\Theta}\Sigma_{m∈QPih}E^*_{imht}), t∈T_h, h=1, \ldots, 7, \quad (19)$$

If there are agent shortages in constraint (16), however, $AOD_{jht}$ for the phone-based contact groups depends on the priorities assigned to phone vs. multimedia channels. Suppose the workload from multimedia channels in $\Theta$ must be met 100%. The method of the invention computes $AOD_{jht}$ as in (19). If it is less than zero, that means even the workload allocated from $\Theta$ in to this planning period can not be met with the agents in this skill group, and therefore, $AOD_{jht}=0$ for phone-based contact groups. All workload from the channels in $\Theta$ not met by agents scheduled for skill group j is considered for agents from other skill groups with proper skills. In another embodiment, agents in a plurality of skill groups may have skills for channels in $\Theta$. In this case, $AOD_{jht}$ for phone-based contact groups may be calculated to meet the agent requirements for phone-based contact groups in (19) first, and any excess agent time may be allocated to multimedia channels in $\Theta$. This way, agent in this skill group will be required to serve multimedia channels in $\Theta$ for which they have skills for when they do not have any phone-based contacts waiting for one of their skills. In yet another embodiment, constraint (17) may be modified to have a shortage variable similar to $B_{ht}$ to allow for scheduling agent time for less than 100% of the workload. In yet another embodiment, a certain percentage of the total workload, p %, from channels in $\Theta$ may be allocated to skill group j. In that case, constraint (16) and expression (19) are modified by replacing $(\Sigma_{i\in\Theta}\Sigma_{m\in QPiht}E^*_{imht})$ by $\{p\ \%(E_{i\in\Theta}\Sigma_{m\in QPiht}E^*_{imht})\}$.

The solution method is discussed within the context of formulations (4-11). However, the solution method and system of the present invention can also be used to solve the modifications and extensions of formulation (4-11). Therefore, the scope of the solution method and system of the invention also includes such ILP models.

The branch and cut ("B&C") algorithm is a well known technique for optimally solving ILP formulations such as (4-11) (Wolsey, 1998). A computer program implementing the B&C algorithm can be developed using any programming language or can be obtained from a number of software providers including Ilog, Inc. and Fair Isaac Corporation. The B&C algorithm is used in the solution method of the present invention.

The B&C algorithm starts with the LP relaxation of the ILP model obtained by relaxing its integrality constraint in (11), and applies a solution method such as the Simplex method (Taha, 1987) to the relaxed model to obtain a solution. If the solution also satisfies all integrality constraints in (11) on the values of the decision variables, the solution is an optimal solutions to the ILP model (4-11). In this case, the B&C algorithm terminates and optimal schedules are generated by creating agent schedules with scheduled work and off days, daily shift start times, shift lengths and break times as specified by the values of the decision variables. If the values specified by the optimal solution of the LP relaxation violate the integrality constraint for at least one variable, the B&C adds new constraints to eliminate fractional values for decision variables so that a solution satisfying all integrality constraints is found. The new constraints are usually added to generate extended problems (called "sub-problems"). Next, a sub-problem among the ones not yet solved is selected, and the LP relaxation of the sub-problem is solved. Details of the B&C method are provided in Wolsey (1998).

The computer implemented method and system of the invention supplements the B&C algorithm by a rounding algorithm ("RA algorithm") to find optimal or near-optimal integer feasible solutions to the ILP model for the skill group considered. After forming new sub-problems, the B&C algorithm selects one and solves the LP relaxation of it. LP relaxations of the sub-problems may be solved one at a time, or two or more at a time in a multi-processor environment. If the optimal solution of the LP relaxation of the selected sub-problem does not satisfy all integrality constraints in (11), the RA algorithm is used to carry out a search using the optimal solution to locate an integer feasible solution. Thus, the purpose of the RA algorithm is to search for an integer feasible solution for the ILP model when the solution of the LP relaxation of a sub-problem found by the B&C algorithm violates one or more integrality constraints.

The RA algorithm is called by the B&C algorithm before forming new sub-problems. The B&C algorithm does not use the RA algorithm under the following conditions: i) the LP relaxation of the sub-problem has no feasible solution, or ii) the solution found for the LP relaxation of the sub-problem is an integer feasible solution. When an integer feasible solution to a sub-problem is found by the RA algorithm or B&C algorithm, its objective function value is an upper bound on the objective function value of any optimal solution of the ILP model. If a new integer feasible solution is found while another one is already known, the method of the invention compares the objective function values of the two integer feasible solutions and the one with the lower objective function value is recorded as the "best known integer feasible solution" while the other is discarded.

The RA algorithm can also be supplemented with a two-way interchange step, or general n-way interchange step so that, when an integer feasible solution is found, the RA algorithm can attempt to improve it by replacing one or more schedules with schedules for other tour types with work patterns, start times, lengths and break start times that are not currently scheduled. This is a well-known enhancement in the field of optimization that is widely applied to a number of other optimization problems.

The computer implemented method and system of the invention may be terminated prior to finding an optimal solution to ILP model (4-11). For example, the B&C algorithm calculates a lower bound for the optimal solution of the ILP model. The method of the invention may terminate the search for an integer feasible solution with a better (lower) objective value than the best know integer feasible solution if (i) the objective function for the best known integer feasible solution differs less than a pre-specified percentage from the best lower bound found by the B&C algorithm, (ii) a pre-specified number of sub-problems are solved by the B&C and RA algorithms, or (iii) a pre-specified amount of cpu time elapses after locating the first integer feasible solution to the ILP model. A solution that is either optimal or not proven to be optimal but satisfies one of these conditions is referred to as a "terminal" solution.

The RA algorithm may also be modified to search for an integer feasible solution to a sub-problem using any of the known heuristics such as the Tabu Search, Simulated Annealing, or Genetic algorithm, or to formulate and add other types of "cuts" (Wolsey, 1998) to sub-problems, change branching direction or priorities in the B&C algorithm. The above description of solution algorithm is exemplary, and one with ordinary skill in the art will appreciate that many variations are possible. These and other modifications of the solution algorithm of the method and system of the invention are also within the scope of the invention.

Once a terminal solution is found, detailed tour schedules for agents (referred to as "terminal schedules") are developed in a number of ways. All such schedules will have the same objective value and, therefore, will be equally effective. Daily shifts scheduled comprised of lengths and start times in the terminal solution by the values of the decision variables $QX_{knhi}$ are assigned to work patterns specified by the values of the work pattern variables $Q_{k1}$ in the terminal solution. Work pattern constraint (9) ensures that a daily shift is scheduled for every agent that will be at work due to the work patterns scheduled in the solution. These daily shifts are assigned to work patterns by following the variable definitions to satisfy tour and shift rules for each tour type. Thus, the weekly tours are stated with off days, and work days with daily start times and shift lengths for every agent scheduled in the solution. Break balance constraints (6-8) ensure that one break of each type is scheduled for every agent scheduled to work. These breaks are assigned to respective work day schedules while making sure that tour type, daily start time, shift length and break window associations specified in the variable definitions are followed correctly to satisfy break scheduling requirements. Detailed weekly schedules are then assigned to specific agents based on their preferences, starting with the agent having the highest priority (e.g. seniority), or using some other method to complete the rostering process.

Once the terminal schedules are obtained for a skill group, the re-scheduling sub-step for that skill group is completed. The method then considers the skill group that is ranked next. For example, if re-scheduling of skill group with R(j)=1 has just been completed, then skill group m with R(m)=2 is considered. The simulation and re-scheduling sub-steps of the iterative step are repeated, as described above, for this skill group to determine the updated staffing levels, and then updated agent schedules while including current schedules and $AOD_{it}$ counts for agents in all other skill groups in the simulation.

As stated before, the method of the invention makes successive iterations. In each iteration, all skill groups are rescheduled, one at a time. Iterations are terminated if (i) difference between service levels found in two successive iterations for all contact groups is less than a pre-specified percentage, (ii) a pre-specified number of iterations are completed, or (iii) a pre-specified amount of cpu time elapses.

The computer implemented method and system of the present invention are described herein as part of the preferred embodiment. However, the examples and descriptions provided are for illustration only and do not restrict in any way the scope and the other applications of the method or use of the computer system of the invention in other settings. For example, the method and system of the invention can be used for staffing and scheduling in non-skills based routing environments. A person with ordinary skills in the art will appreciate that many variations of the method and computer system of the invention and its use in different systems is possible and well within the scope of the invention.

Having thus described our invention, what we claim as new and desire to secure by letters patents is as follows:

1. A computer implemented method for developing schedules comprising the steps of:
   (a) acquiring a scheduling period, consisting of a plurality of planning periods, a plurality of contact groups, one or more service level targets for the plurality of contact groups, contact volume forecasts and average service time forecasts for each contact group of the plurality of contact groups over the scheduling period by a computer;
   (b) acquiring skill groups including a plurality of agents together with their skills and skill levels, and scheduling rules by the computer;
   (c) acquiring initial schedules for the plurality of agents in each skill group and designating the generated initial schedules as current schedules for the plurality of agents in the each skill group by the computer;
   (d) selecting a first skill group of the skill groups by the computer;
   (e) updating the agent requirements for the first skill group selected in step (d) by un-scheduling the plurality of agents in the first skill group and discarding the current schedules, maintaining the current schedules for the plurality of agents that are not included in the first skill group and using a staffing model to determine the minimum agent requirements for the first skill group to most closely meet the service level targets by the computer;
   (f) generating new current schedules for the plurality of agents in the first skill group selected in step (d) using the updated agent requirements found in step (e) by the computer;
   (g) repeating steps (d-f) for the each skill group of the skill groups until every skill group of the skills groups is unscheduled, the agent requirements are updated, and the plurality of agents in every skills group of the skill groups is re-scheduled by the computer; and
   (h) repeating steps (d-g) in one or more iterations until a set of final schedules is found for the plurality of agents in every skill group of the skill groups after satisfying one or more stopping criteria conditions by the computer.

2. The computer implemented method of claim 1, wherein a staffing model analyzes contact arrivals and service times based on the contact volume and average service time forecasts for the plurality of contact groups over the scheduling period, contact abandonments, contact routing rules, and the initial schedules for the plurality of agents that are not included in the first skill group.

3. The computer implemented method of claim 1, wherein the new current schedules for the plurality of agents in every skill group is generated using a scheduling algorithm.

4. The computer implemented method of claim 3, wherein the scheduling algorithm comprises of formulating the constraints and objective function of an Integer Linear Programming (IP) model.

5. The computer implemented method of claim 1 wherein agent requirements for a skill group unscheduled are updated to meet service level targets for contact groups using the staffing model.

6. The computer implemented method of claim 1, wherein the one or more stopping criteria conditions may includes the difference between the service levels found in two successive iterations for the all contact groups being less than a pre-specified value.

7. The computer implemented method of claim 1, wherein the one or more stopping criteria conditions includes exceeding a pre-specified maximum number of iterations.

8. The computer implemented method of claim 1, wherein the one or more stopping criteria conditions includes exceeding a pre-specified period of time.

9. A computer implemented method for developing schedules, the method comprising:
   retrieving from a database including stored therein initial schedules for a plurality of agents grouped in a first group of agents and a second group of agents according to skills and skill levels;
   un-scheduling the plurality of agents in the first group of agents by discarding the initial schedules for the plurality of agents in the first group of agents and updating, by a computer, agent requirements for the first group of agents over a scheduling period using a staffing model by determining minimum agent requirements for the plurality of agents in the first group of agents that most closely meets the service level targets for the first group of agents while maintaining the schedules for the plurality of agents in the second group of agents, and rescheduling agents in the first group of agents to most closely meet the updated agent requirements for the first group of agents;

un-scheduling the plurality of agents in the second group of agents by discarding the initial schedules for the plurality of agents in the second group of agents and updating, by the computer, agent requirements for the second group of agents over the scheduling period using the staffing model by determining minimum agent requirements for the plurality of agents in the second group of agents that most closely meets the service level targets for the second group of agents while maintaining the schedules for the plurality of agents in the first group of agents, and rescheduling agents in the second group of agents to most closely meet the updated agent requirements for the second group of agents; and repeating, by the computer, the updating of the agent requirements for the plurality of agents in the first group of agents and the second group of agents and iteratively rescheduling the first group of agents and the second group of agents until a set of final schedules is found for the plurality of agents by satisfying one or more stopping criteria conditions.

10. The computer implemented method of claim 9 further comprising:

maintaining in the computer, initial schedules for the scheduling period of a third group of agents while rescheduling the first group of agents and the second group of agents;

un-scheduling the plurality of agents in the third group of agents by discarding the initial schedules for the plurality of agents in the third group of agents and updating, by the computer, agent requirements for the third group of agents over a scheduling period using the staffing model by determining minimum agent requirements for the plurality of agents in the third group of agents that most closely meets the service level targets for the third group of agents while maintaining the schedules for the plurality of agents in the first group of agents and the second group of agents, and after updating agent requirements for the third group of agents, rescheduling agents in the third group of agents to most closely meet the updated agent requirements for the third group of agents.

11. The computer implemented method of claim 10, wherein the first group of agents has a higher rank compared to the second group of agents and the third group of agents.

12. The computer implemented method of claim 9, wherein the new current schedules for the plurality of agents in every skill group is generated using a scheduling algorithm.

13. A computer implemented method for developing schedules, the method comprising:

(a) selecting, by the computer, a first skill group among a plurality of skill groups that is the highest ranked skill group wherein the skill group includes a plurality of agents;

(b) updating, by the computer, agent requirements for the plurality of agents in the first skill group selected in step (a) by un-scheduling the plurality of agents in the first skill group and discarding the current schedule for each of the plurality of agents in the first skill group, while keeping a current schedule of each of the plurality of agents that are not in the first skill group by using a staffing model to determine the minimum agent requirements for the first plurality of agents in the first skill group to most closely meet service level targets;

(c) generating, by the computer, schedules for the plurality of agents in the first skill group selected in step (a) using the updated agent requirements found in step (b) and making the generated schedules for the plurality of agents the current schedules for the agents in the skill group selected in step (a);

(d) repeating, by the computer, steps (a-c) by selecting each lower ranked skill group of the plurality of skill groups; and (e) iteratively rescheduling the plurality of agents in each skill group of the plurality of skill groups until a set of final schedules is found for the plurality of agents by satisfying one or more stopping criteria conditions.

14. The computer implemented method of claim 13, wherein the new current schedules for the plurality of agents in every skill group is generated using a scheduling algorithm.

* * * * *